May 30, 1933.　　　C. W. FIKE　　　1,911,887
CEREAL TOASTING MACHINE
Filed Aug. 28, 1931　　　4 Sheets-Sheet 1
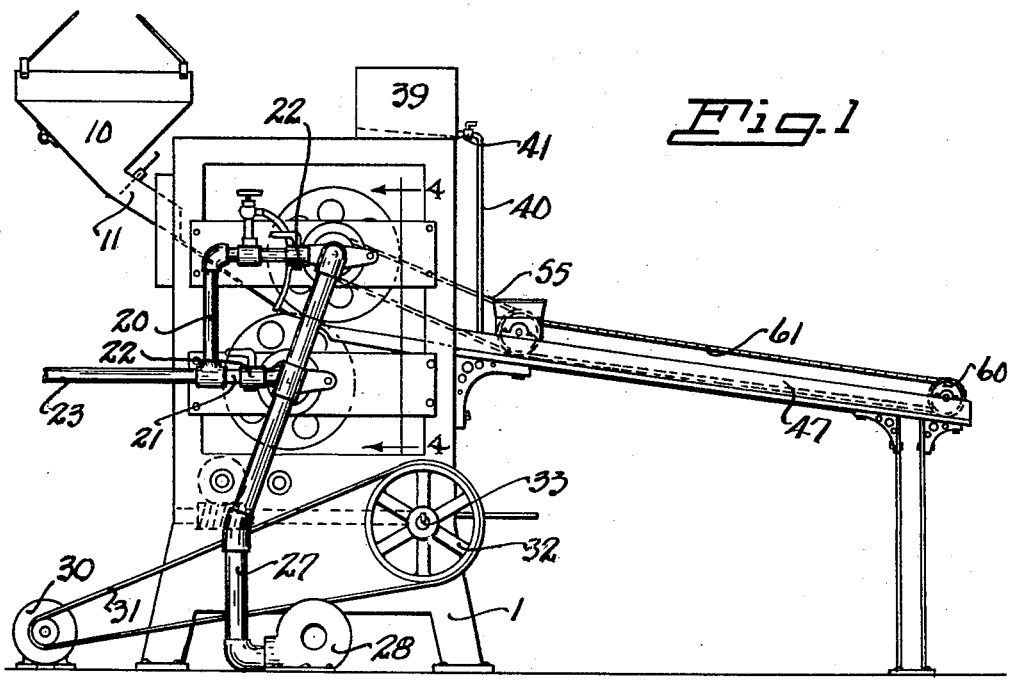
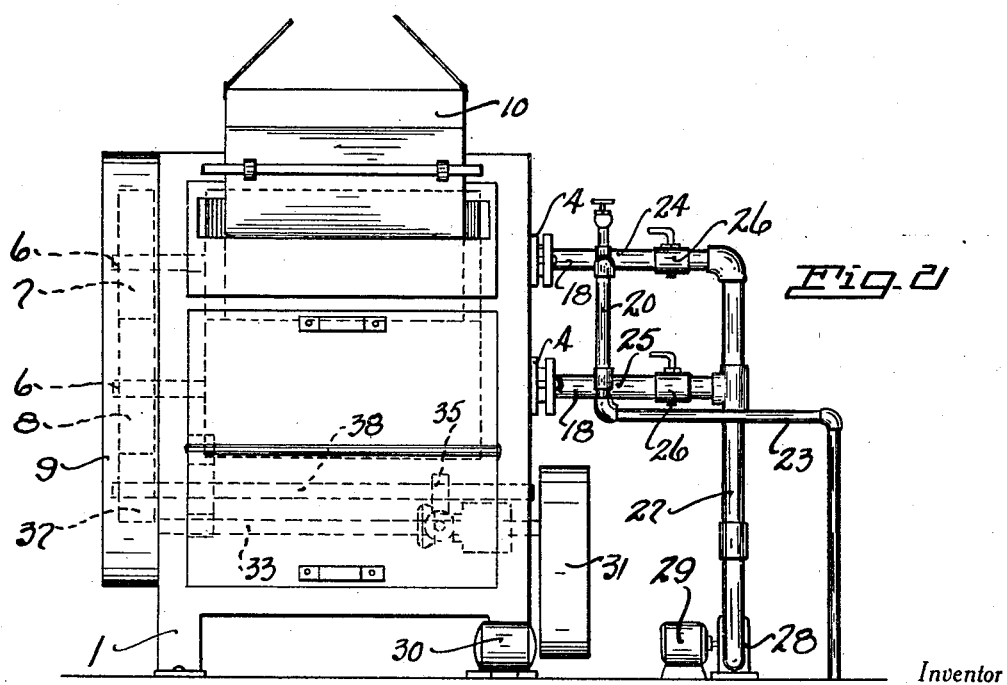
Inventor
CHARLES WESLEY FIKE
By Herbert E. Smith
Attorney

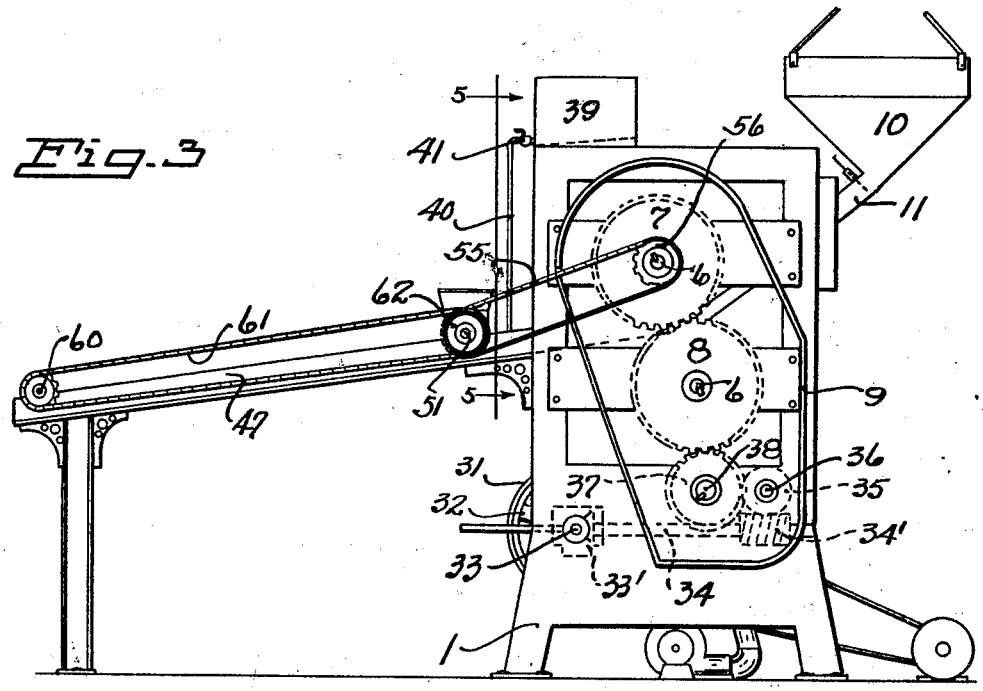
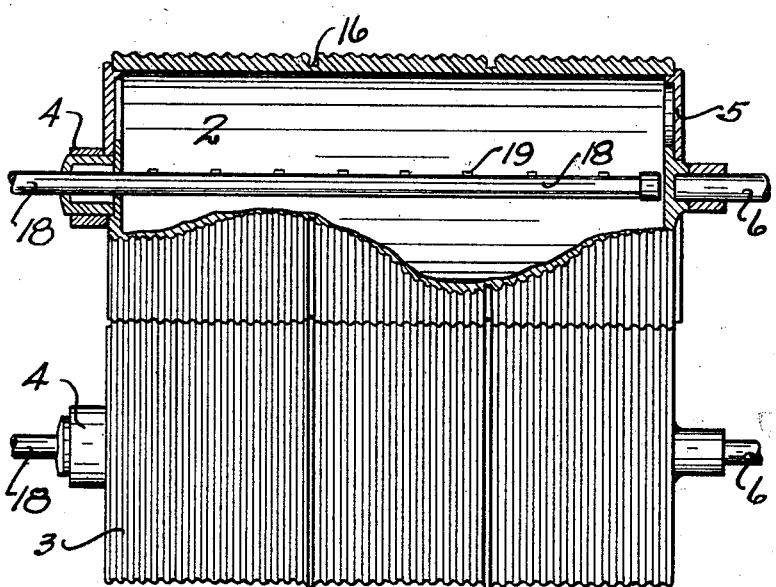

May 30, 1933.  C. W. FIKE  1,911,887
CEREAL TOASTING MACHINE
Filed Aug. 28, 1931    4 Sheets-Sheet 3
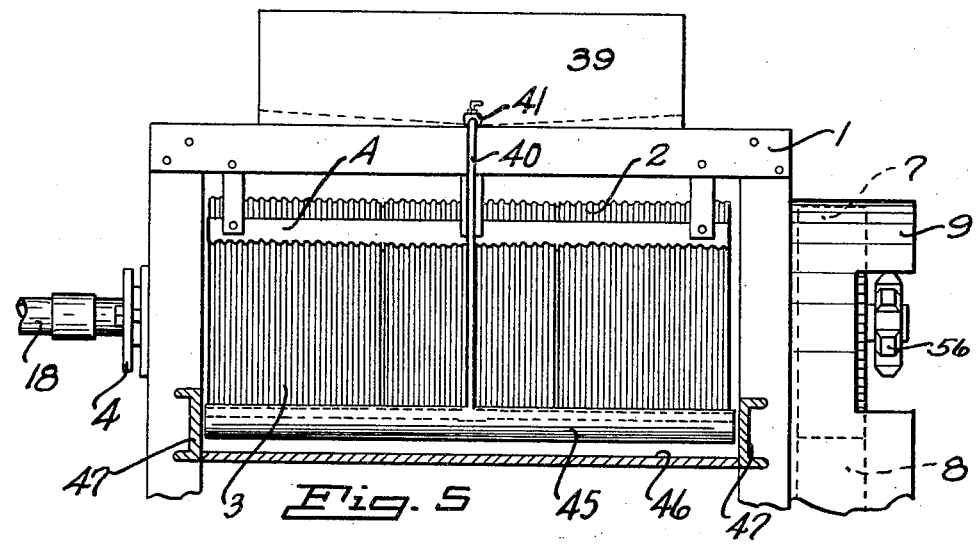
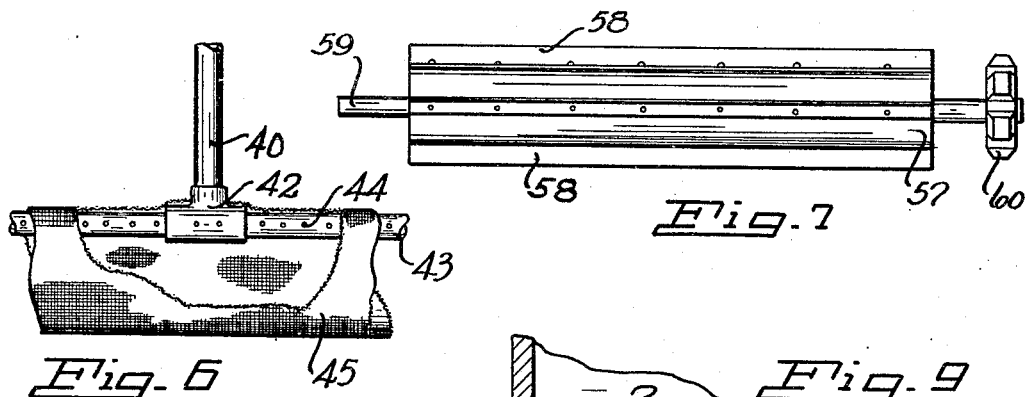
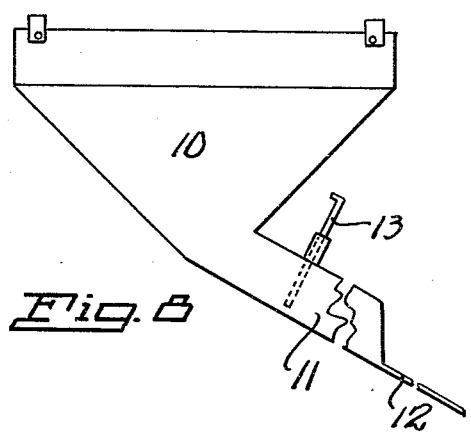
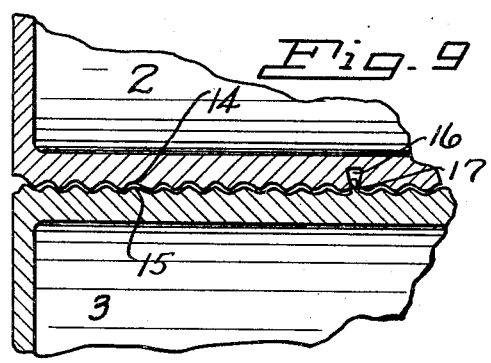
CHARLES WESLEY FIKE
Inventor
By *Herbert E. Smith*
Attorney CHARLES WESLEY FIKE
Inventor Patented May 30, 1933

1,911,887

UNITED STATES PATENT OFFICE

CHARLES WESLEY FIKE, OF SPOKANE, WASHINGTON, ASSIGNOR TO WHEAT CHIPS INCORPORATED, OF SPOKANE, WASHINGTON

CEREAL TOASTING MACHINE

Application filed August 28, 1931. Serial No. 559,836.

My present invention relates to an improved cereal toasting machine or apparatus of the type that is adapted to roll and toast a mash of grain berries into corrugated or crimped sheets, longitudinally split or divide the sheet into ribbons of desired width, and then finally cut the ribbons into chips or wafers of the desired length. The grains of any suitable cereal, or combinations of cereals may be thus treated, but for convenience of illustration and description I shall refer to the cereal as wheat berries and the product of the machine as wheat wafers or wheat chips.

In carrying out my invention I employ a pair of hollow, heated, and transversely corrugated rolls to which the mash or moist bran is fed, and as the mash passes between the rolls it is pressed and toasted and crimped into a crisp sheet that is split into ribbons and the ribbons then cut or severed into wafers or chips. Rotary cutters are employed for splitting the sheet into ribbons, and rotary cutters are employed for chopping off or cutting the ribbons into wafers or chips, and the rolls and cutters are operated in synchronism for the production of the food products.

The machine is compactly arranged, and its parts co-operate one with another to insure maximum efficiency in production and uniformly correct wafers or chips with respect to size and shape.

Means are also provided for seasoning the product of the machine in order that the wafers or chips, as they are finished and leave the machine, may be ready for consumption as a confection, a breakfast food, or other food product; or the wafers may be packed for shipping or storage.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention. The machine as illustrated and described has been used successfully in actual practice, but it will be understood that various changes and alterations may be made in the exemplified structure, within the scope of my claims without departing from the principles of my invention.

Figure 1 is a view in side elevation of a machine embodying the novel combinations of my invention.

Figure 2 is a rear view, at the feed end of the machine, as seen from the left in Figure 1.

Figure 3 is a side view of the machine, as seen from the left in Figure 2.

Figure 4 is a view, enlarged, showing the two rolls, one of which is broken away for convenience of illustration, at line 4—4 of Figure 1.

Figure 5 is a view partly in section and partly in elevation, as at line 5—5 of Figure 3, at the front of the machine, showing particularly a roll-scraper, and the butter-distributing device for the wafers.

Figure 6 is an enlarged, fragmentary, detail view of the butter distributor and its wiper.

Figure 7 is a detail view of the rotary, transverse cutter that severs the ribbons into wafers or chips.

Figure 8 is a side view of the feed hopper, enlarged.

Figure 9 is a detail sectional view showing portions of the rolls, and one of the rotary splitting knives.

Figure 10:
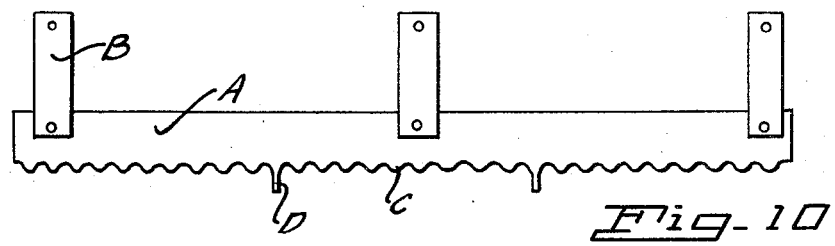
Figure 10 is a detail view of the roll scraper, detached from the machine.
Figure 11:
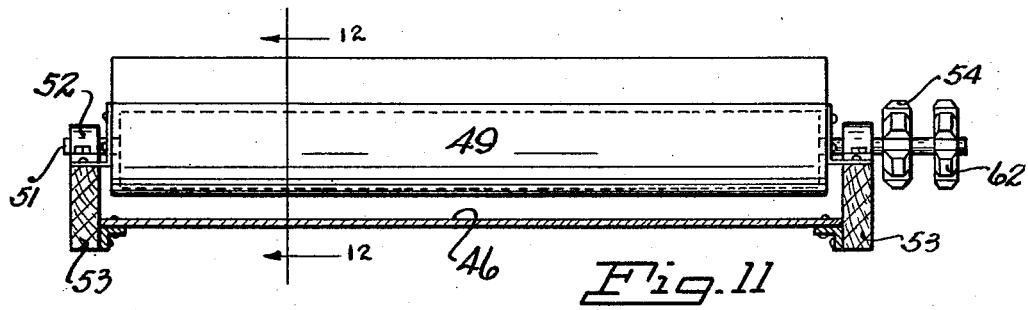
Figure 11 is a detail view, partly in section, of the seasoning device, or salt distributor.
Figure 12:
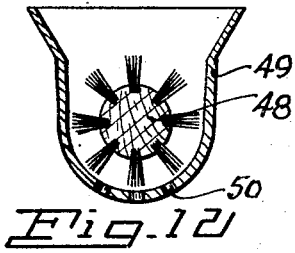
Figure 12 is a transverse sectional view at line 12—12 of Figure 11.

In preparing the mash for treatment by the machine, the whole wheat berries are first soaked in water for a suitable period of time, after which the water is drained off, and the mash is ready to be fed, in regulated quantities to the machine.

The main frame 1 of the machine is an upright structure, forming a support for the operating parts, and also a partial enclosure that may be provided with necessary doors, detachable plates, and other accessories as usual. Two cylindrical, hollow, rolls 2 and 3 are journalled in bearings 4, in the structure, and at one end of each roll the head 5 is provided with a stud shaft 6 having mounted thereon the meshed gears 7 and 8 located within the gear case 9.

The mash is supplied to a hopper 10 located at the rear of the machine and elevated above the machine to provide a gravity feed through the nozzle 11 that extends across the machine the full length of the rolls, and terminates in a flat feed plate 12. The feed nozzle is provided with a gate or valve 13, that is adjustable to govern the flow of mash through the nozzle, and this mash flows with a gravity feed down the inclined feed plate 12 to the rolls.

The upper roll 2 turns anti-clockwise and the lower roll 3 turns clockwise, and as shown the centers of the rolls are offset, or in different vertical planes, with the free edge of the feed plate 12 terminating on a line approximately above the longitudinal axis of the lower roll, and under a portion of the down-turning periphery of the upper roll. In this manner the mash is received on the top of the lower roll and then fed by the lower roll under the upper roll, and of course between both rolls, in a continuous sheet.

Figure 13:
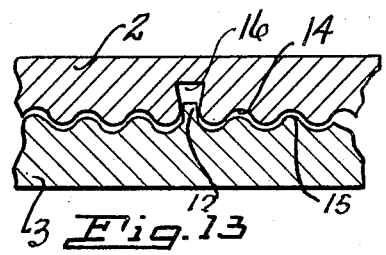
Figure 13 is an enlarged detail sectional view of parts of the rolls showing their corrugated peripheries in mesh, and one of the splitting knives.

The hollow rolls are provided with fluted peripheries formed by alternating annular grooves 14 and ribs 15, and the ribs of one roll mesh with the grooves of the other roll, the rolls being slightly spaced apart as indicated in Figure 13 to fashion the longitudinally crimped or corrugated sheet of the desired thickness.

The sheet is cut in strips or ribbons of desired width by means of annular cutters, the number of cutters being varied according to the number of ribbons desired to be cut, and of course the increased number of cutters in a given length of roll decreases the width of the ribbon and increases the number of ribbons. In the drawings two annular cutters are shown for cutting the sheet into three ribbons or strips. The upper roll 2 is provided with a pair of spaced annular grooves 16, which as best shown in Figure 13 are of considerable depth, and the inner portion of the groove is wider than the surface opening of the groove, or in other words, the groove is dove-tail in shape. The lower roll 3 is provided with a pair of annular, exterior, spaced, splitting knives 17 which fit into the complementary grooves, and sever the sheet into strips or ribbons. The depth and width of the dove-tail groove are greater than the complementary dimensions of the annular fin or splitting blade 17, in order that the material, which may be forced into the groove by the blade, will not be compacted, but will remain loose in the groove, and thereby permit ready removal of this excess material, as will be described.

Both of the hollow cylindrical rolls are heated from their interiors, and I preferably utilize gas for the heating medium. For this purpose each roll is provided with a stationary gas burner 18 in the form of a pipe that projects longitudinally along the axis of the hollow roll and is provided with burner tips 19 spaced at suitable intervals. The burners project through the trunnion bearings 4 at the ends of the rolls and they are supplied with gas through the branch pipes 20 and 21 which are fitted with valves 22 to regulate the flow of gas from the main gas pipe 23. To supply the necessary oxygen to support combustion at the burner tips a pair of branch air-pipes 24 and 25 are connected with the gas pipes and the air valves 26 regulate the supply of air. A main air pipe 27 is connected with a blower 28 that is operated by the electric motor 29 to force the air through the main and branch pipes and to cause the air to mix with the gas, as these elements pass to the burner or heater, and the blast may be regulated by the air valves.

By the use of the heaters the rolls are heated to a temperature preferably less than 160 degrees F., to prevent destroying any of the food values, but the temperature is sufficiently high to toast the mash to a crisp consistency. The corrugations in the peripheries of the rolls provide a maximum toasting area for the rolls, and the crimps imparted to or formed in the ribbons, by the corrugated rolls, tend to strengthen the body of the ribbon or strip.

One or both of the rolls may be scraped to remove any flakes or particles from their corrugated peripheries, and also to remove excess material from the annular grooves 16 in which the splitting blades or fins 17 work. Thus, as shown in Figure 5, the upper roll is provided with a scraper blade A that is supported by brackets B at the front of the machine, above the longitudinal axis of the roll. The blade is fashioned with a corrugated edge C, complementary to the corrugated periphery of the roll, and the brackets B, or the blade A may be made of resilient material by means of which the serrated edge C of the blade is pressed into contact with the periphery of the roll for scraping purposes. The blade A also has a pair of spaced fingers D that fit into the grooves 16 of the roll to scrape excess material from these grooves and prevent the material from packing in the grooves.

The rolls are positively driven or revolved in their described directions from an electric motor 30 through the belt drive 31 and pulley 32 on the shaft 33 and a bevel gear-couple 33' transmits motion from the shaft 33 to the worm shaft 34 having thereon a worm gear 34'. This worm gear meshes with a pinion 35 on the shaft 36 and the pinion 35 also meshes with a drive pinion 37 on the shaft 38, the pinion 37, as shown in Figure 3 meshing with the roll-gear 8. The lower roll is thus revolved anti-clockwise, and by means of the roll gears 8 and 7 the upper roll is revolved clockwise, as described.

As the ribbons or strips emerge from between the rollers they are spread with butter, or a butter substitute, in liquid form, to enhance the appearance of the wafers and to impart a tasty flavor thereto. The melted butter is supplied by gravity feed from a tank 39 supported on the top of the enclosure at the front of the machine, and a pipe 40, with a regulating valve 41, extends from the tank down in front of the upper roll to an elbow 42 in which is fitted the distributing, horizontally disposed pipes 43 having nipples 44. The distributor pipes and nozzles are encased within a tubular wiping wick 45 fashioned from suitable open-work or coarse mesh material or fabric, and it will be apparent that the melted butter is distributed by the nipples along the length of this wiping tube. The flexible and porous wiping tube is suspended on the pipes 43 in such position that the lower portion of the tube will gently rest on the tops of the crisp ribbons as they emerge from the rollers or rolls and slide out on an inclined discharge apron or plate 46 located between the two side guides 47 for the ribbons. Thus, the ribbons pass under the wiper 45 and the former are coated or spread with the melted butter because of their frictional contact with the wiper.

A condiment, as salt, may also be spread upon the upper surface of the crimped ribbons, and a device for this purpose is located adjacent the butter wiper in order that the condiment, or seasoning agency may be sprinkled or applied to the ribbons before the butter coating dries or hardens. The seasoning agency, as salt in fine crystals is spread and caused to sprinkle on the buttered ribbons by means of a rotary brush 48, disposed transversely of the machine, above the ribbons, and located in a stationary trough 49 supported on the side guides 47 in front of the butter spreader.

The bristles of the brush revolve in close proximity to the rounded, perforated bottom 50 of the trough, and it will be apparent that the brush will break up any lumps in the salt contained in the trough, and sweep the crystals through the perforations in the bottom of the trough to sprinkle them uniformly on the buttered ribbons. As the coating of melted butter hardens or dries, the salt crystals are firmly adhered to the ribbons.

As best seen in Figure 3 the brush is revolved through its shaft 51 that is journaled in bearings 52 on the extension frame 53, by means of a sprocket wheel 54 on shaft 51, chain 55, and the sprocket wheel 56 on the upper roll-shaft 6.

As the ribbons slide down the guide plate or apron 46 supported in inclined position in the front extension frame of the machine, the ribbons are permitted to harden, and as the ribbons reach the front end of the extension they are cut transversely into suitable lengths to form the finished wafers or chips. For this purpose a rotary cutter 57, having two longitudinally extending blades or choppers 58 attached thereto, is journalled by means of its shaft 59 and bearings 59', transversely at the front end of the extension frame. The shaft is provided with a sprocket 60, and a sprocket chain 61 is driven from sprocket wheel 62 on the brush shaft 51.

Figure 14:
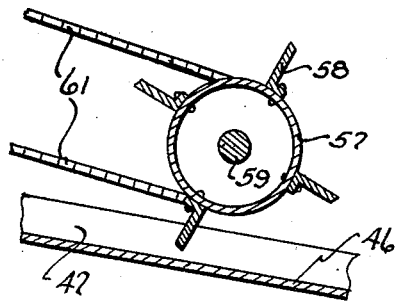
Figure 14 is a sectional detail view showing the chopping knives or transversely arranged rotary cutters, at line 14—14 of Figure 7.

The tip edges of the cutters 58, as shown in Figure 14 are designed to frictionally engage the ribbons and press the ribbons against the guide plate 46, and the cutter is revolved so that these cutting edges of the blades or knives 58 will have the same speed of movement as the ribbons passing under them. Thus the cutting edges of the knives engage and move with the ribbons, and as the latter are pressed against the upper face of the guide plate 46 the chips or wafers are severed from the ribbons. The size of the cutter may be varied, and its position adjusted and the number of cutter knives or blades 58 may be varied for the purpose of varying the lengths of the wafers or chips that are cut from the ribbons, but in all cases, the blades or knives will have their edges pressed through the ribbons to sever the wafers.

In the manner thus described the finished product may be discharged from the machine into a bin, or packed into containers for storing, shipping, and commercial purposes.

The width of the ribbons and the length of the wafers or chips cut therefrom may be varied for different purposes, and the parts of the machine may be changed accordingly, and various other changes and alterations may be made in the exemplified structure of the machine, as fall within the scope of my appended claims.

Having thus fully described my invention, what I claim as new and desire to secure by Letters Patent is:—

1. In a cereal toasting machine, the combination with a pair of rolls, operating means therefor, and a guide plate for the product, of a wiper suspended above the guide plate for contact with the product, means for supplying a liquid-coating material to the wiper, a trough having a perforated bottom supported over the product adjacent the wiper, a rotary brush in the trough, and means for operating the brush to sprinkle a condiment on the wiped product.

2. The combination with a pair of externally corrugated, hollow, heated rolls having their axes disposed in a forwardly inclined plane, and means for revolving the rolls in opposite directions, of a hopper having a discharge nozzle and a feed plate extended from said nozzle, said feed plate having its front edge disposed above the approximate vertical center of the lower roll, one of said rolls having an annular groove of dovetail shape with its maximum width at its maximum depth, an annular splitting blade on the other roll having a thickness approximately the minimum width of said groove and adapted to form ribbons, and means for transversely cutting said ribbons into wafers.

In testimony whereof I affix my signature.

CHARLES WESLEY FIKE.